US008677458B2

(12) United States Patent
Roth et al.

(10) Patent No.: US 8,677,458 B2
(45) Date of Patent: Mar. 18, 2014

(54) HIERARCHICAL STRUCTURE OF A NOTIFICATION SYSTEM INCLUDING RIGHTS BASED ON ROLES

(75) Inventors: Joshua Roth, Pacific Palisades, CA (US); Bing Chen, Glendale, CA (US)

(73) Assignee: Blackboard Connect Inc., Washington, DC (US)

( * ) Notice: Subject to any disclaimer, the term of this patent is extended or adjusted under 35 U.S.C. 154(b) by 797 days.

(21) Appl. No.: 12/344,112

(22) Filed: Dec. 24, 2008

(65) Prior Publication Data
US 2010/0162364 A1 Jun. 24, 2010

(51) Int. Cl.
G06F 7/04 (2006.01)
(52) U.S. Cl.
USPC .................................. 726/4; 726/1; 726/28
(58) Field of Classification Search
USPC .................................. 726/4, 1, 2, 28; 709/216
See application file for complete search history.

(56) References Cited

U.S. PATENT DOCUMENTS

| 6,078,924 A | 6/2000 | Ainsbury et al. | |
| 6,385,655 B1* | 5/2002 | Smith et al. | 709/232 |
| 6,751,657 B1* | 6/2004 | Zothner | 709/220 |
| 8,166,126 B2* | 4/2012 | Bristow et al. | 709/207 |
| 8,244,669 B2* | 8/2012 | Ellis et al. | 707/609 |
| 8,560,632 B2* | 10/2013 | Kamga et al. | 709/217 |
| 2005/0076109 A1* | 4/2005 | Mathew et al. | 709/223 |
| 2008/0091774 A1* | 4/2008 | Taylor et al. | 709/203 |
| 2008/0273699 A1 | 11/2008 | Roth | |
| 2009/0077191 A1* | 3/2009 | Bristow et al. | 709/207 |
| 2010/0169344 A1* | 7/2010 | Ellis et al. | 707/758 |

FOREIGN PATENT DOCUMENTS

WO WO 2007/075389 7/2007

* cited by examiner

*Primary Examiner* — Samson Lemma
(74) *Attorney, Agent, or Firm* — McDermott, Will & Emery LLP

(57) ABSTRACT

A method for determining access privileges for transmitting mass notifications, is disclosed. The method includes storing information regarding user-level access privileges of a group to transmit a notification. The user group includes a user that inherits the user-level access privileges of the user group. The method also includes storing information regarding administrator-level access privileges of an administrator group, and permitting access to transmit the notification by the user based on the user's access privileges, the at least one notification, and the at least one recipient. The administrator group includes an administrator that inherits the administrator-level access privileges. The administration module is configurable by the administrator based on the administrator's access privileges. A system for determining access privileges for transmitting mass notifications is also provided.

21 Claims, 8 Drawing Sheets

Turn Call Authorization On

| Contact Type | Required | Msg Type | Contact Limit(%) | And/Or | Time Window |
|---|---|---|---|---|---|
| Student | ☐ | All ▾ | 0 % | AND ▾ | 19:00 - 7:00 |
| Admin | ☐ | All ▾ | 0 % | AND ▾ | 19:00 - 7:00 |
| Faculty | ☑ | All ▾ | 100 % | OR ▾ | 19:00 - 7:00 |
| Staff | ☐ | All ▾ | 0 % | AND ▾ | 19:00 - 7:00 |
| Other | ☐ | All ▾ | 0 % | AND ▾ | 19:00 - 7:00 |

[ Update Rules ]  You must click update to save changes!

Authorizer List

| A | SA | NAME | SCHOOL/DISTRICT | TITLE |
|---|---|---|---|---|
| ▾ | ▾ | MARIO JOY | NORTH EAGLE SCHOOL DISTRICT (DEMO) | |
| ▾ | ▾ | MR. ROBERT T NOLOGY | NORTH EAGLE SCHOOL DISTRICT (DEMO) | DIRECTOR OF TECHNOLOGY |

List of Users

FIG. 4A

☐ Click here to acknowledge that your message requires authorization before it can be sent. Further authorization instructions will be provided on the next screen.

Authorization may be required because of the number of contacts you have selected.

— 413

Message: Welcome Back — 414

Delivery Type(S): phone ▼  E-mail 📧  SMS 📱

[EDIT]

Contacts Selected: 3,186 — 415
Unique Deliveries: ❓ 445 phone Deliveries
                      15 E-mail Deliveries — 411
                      2 SMS Deliveries ☑ You have selected to send this message to more than 75% of your contacts, please check the box to the left to confirm this is correct.

[EDIT]

Delivery Date & Time: 10/29/2008 at 1:30 PM (PT) — 412

Delivery OPTIONS: ☑ Send message via telephone ❓
                  ☑ Send message via e-mail ❓
                  ☑ Send message via SMS ❓

[EDIT]

Message Authorization

Your message requires authorization before it can be sent. Please contact one of the persons below and request that they approve your message by using their Connect-ED Dial-In Messaging Card

| NAME | SITE | PRIMARY PHONE | SECONDARY PHONE |
|---|---|---|---|
| MARIO JOY | NORTH EAGLE SCHOOL DISTRICT (DEMO) | 866-555-7684 | |
| MR. ROBERT T NOLOGY | NORTH EAGLE SCHOOL DISTRICT (DEMO) | 818-555-1799 | |

Log

Mary Smith
NORTH EAGLE SCHOOL DISTRICT (DEMO)

Site: [NORTH EAGLE SCHOOL DISTRICT (D ▼]

Below is a list of your message sending activity. Before a message is sent you can Edit or Delete it. Once a message has been sent, click Summary to view the details or to resend undelivered calls.

📅 = Outreach   ✓ = Attendance   ? = Survey

Show: [All Messages ▼]

Viewing 1-14 of 14 schedules

Search: [_____]

Go to page: [____] ▲ ▼ Page: 1 of 1 ▲ ▼

| Type | Delivery | Message Title | Phone | E-mail | SMS | Status |
|---|---|---|---|---|---|---|
| 📅 | 10/29/2008 1:30 PM (PT) | Welcome Back Sent by: MARY SMITH | ▽ | ◉ | ▤ | phone: Pending<br>e-mail: Pending<br>SMS: Pending |

[EDIT] [DELETE] [SUMMARY]

430, 431, 432

HIERARCHICAL STRUCTURE OF A NOTIFICATION SYSTEM INCLUDING RIGHTS BASED ON ROLES

BACKGROUND

1. Field

The present disclosure relates to transmission of notifications, and more particularly, to methods and systems for the structuring of rights to transmission of notifications based on roles.

2. Background

Businesses and governmental entities, including municipalities and schools, are ever more reliant on communicating through the mass transmission of notifications to their staff, citizens and family members of students to keep these constituencies apprized of important events, and sometimes of emergencies. For example, a school principal might need to distribute a message to the parent of every child that the school will be closed the next day due to some unforeseen event such as flooding, fire, or freezing conditions. As another example, an official from a fire department, police department, or city departments might need to distribute a message to every resident that a street will be closed due to an emergency. As a further example, a military officer might need to distribute a message to his junior officers that training is canceled due to a conflict in scheduling. Notifications with such messages might be sent by telephones, facsimiles, pagers, electronic mail (e-mail), and/or text messages. These notifications will typically vary in their degree of importance, in the number of recipients, or in the immediacy with which they must be sent.

However, there currently exists a growing problem as mass notification transmission systems become more prevalent. In particular, it is difficult to monitor access to the transmission of notifications to potential recipients since the number of potential recipients and the number of users/initiators that transmit the notifications are constantly increasing. For example, in the context of a school system, if a teacher intends to distribute a notification to a large number of recipients, such as all parents and/or guardians of students at a school, it is important to ensure that the teacher has the appropriate authority to distribute the notification to such a large number of recipients, and that the notification is appropriate for the intended recipients. A principal of the same school, however, may not require need for such authorization. As another example, if the same teacher intends to distribute a notification to a smaller number of recipients, such as only the parents and/or guardians of students in the teacher's class, the teacher may be provided a different level of authorization to distribute the notification.

In such situations, it is important that users have the appropriate authorization rights or access privileges to distribute different types of notifications based on those users' roles in the notification system. It would thus be desirable to assign access privileges to transmit notifications to intended recipients in a uniform and efficient manner.

SUMMARY

There is a need for a notification system that assigns access privileges to users to transmit notifications based on the users' roles. Embodiments of the disclosed systems and methods address this and other needs.

The present disclosure describes systems and methods whereby access privileges to distribute notifications to intended recipients are assigned based on the role of the user sending the notification.

In certain aspects of the disclosure, a method for determining access privileges for transmitting mass notifications, is provided. The method includes storing information regarding user-level access privileges of a user group to transmit a notification. The user group includes a user that inherits the user-level access privileges of the user group. The method also includes storing information regarding access privileges of an administrator group, and permitting access to transmit the notification by the user based on the user's access privileges, the notification, and the recipient. The administrator group includes an administrator that inherits the administrator-level access privileges, and the administration module is configurable by the administrator based on the administrator's access privileges.

In a further aspect of the disclosure, a system for determining access privileges for transmitting mass notifications, is provided. The system includes a transmission module configured to transmit a notification to a recipient from a group of recipients, and a user module configured to store information regarding user-level access privileges of a user group to transmit the notification. The user group includes a user that inherits the user-level access privileges of the user group. The system also includes an administration module configured to store information regarding administrator-level access privileges of an administrator group, and further configured to permit access to transmit the notification by the user based on the user's access privileges, the notification, and the recipient. The administrator group includes an administrator that inherits the administrator-level access privileges, and the administration module is configurable by the administrator based on the administrator's access privileges.

In yet a further aspect of the disclosure, a machine-readable medium encoded with instructions for determining access privileges for transmitting mass notifications, is provided. The instructions include storing information regarding user-level access privileges of a user group to transmit a notification. The user group includes a user that inherits the user-level access privileges of the user group. The instructions also include storing information regarding administrator-level access privileges of an administrator group, and permitting access to transmit the notification by the user based on the user's access privileges, the notification, and the recipient. The administrator group includes an administrator that inherits the administrator-level access privileges, and the administration module is configurable by the administrator based on the administrator's access privileges.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIGS. 4A-4D are sample user interfaces for selecting notifications to distribute to intended recipients based on the access privileges associated with the role of the user.

DETAILED DESCRIPTION

There is a problem in mass notification systems of providing appropriate rights to users to transmit different types of notifications to any number of intended recipients based on the users' roles. This and other problems are addressed and solved, at least in part, by embodiments of the present disclosure which include a system for determining access privileges for transmitting mass notifications, is provided. The system includes a transmission module for transmitting a notification to a recipient from a group of recipients, and a user module configured to store information regarding user-level access privileges of a user group to transmit the notification. The user group includes a user that inherits the user-level access privileges of the user group. The system also includes an administration module configured to store information regarding administrator-level access privileges of an administrator group, and further configured to permit access to transmit the notification by the user based on the user's access privileges, the notification, and the recipient. The administrator group includes an administrator that inherits the administrator-level access privileges, and the administration module is configurable by the administrator based on the administrator's access privileges.

With reference to the drawings, which are provided by way of exemplification and not limitation, there are disclosed embodiments for disseminating a mass of outgoing digital notifications to a selected group, or groups, of recipients by way of various communication methods. More specifically, the assignment of access privileges to users to transmit notifications to intended recipients based on the users' roles is disclosed. As discussed herein, the term "access privilege" or "right" refers to the ability of any user of the notification system to affect a notification that the notification system is capable of transmitting. Affecting a notification can include, for example, and without limitation, generating, editing, deleting, accessing, transmitting, or otherwise altering any of the following characteristics associated with the notification, such as, but not limited to: notification content, a message included with the notification, a recipient, a sender, a location, a time value, a number value, and a location. Also as discussed herein, the term "role" refers to any set of rights, privileges, obligations, or positions associated with a user of the notification system, such as the relationship between the position of the user in the notification system hierarchy of access privileges as compared to another user. As further discussed herein, the terms "user" and "administrator" are not intended to refer solely to individual persons, and may include, without limitation, reference to one or many persons, entities, organizations, systems, or machines.

Figure 1:
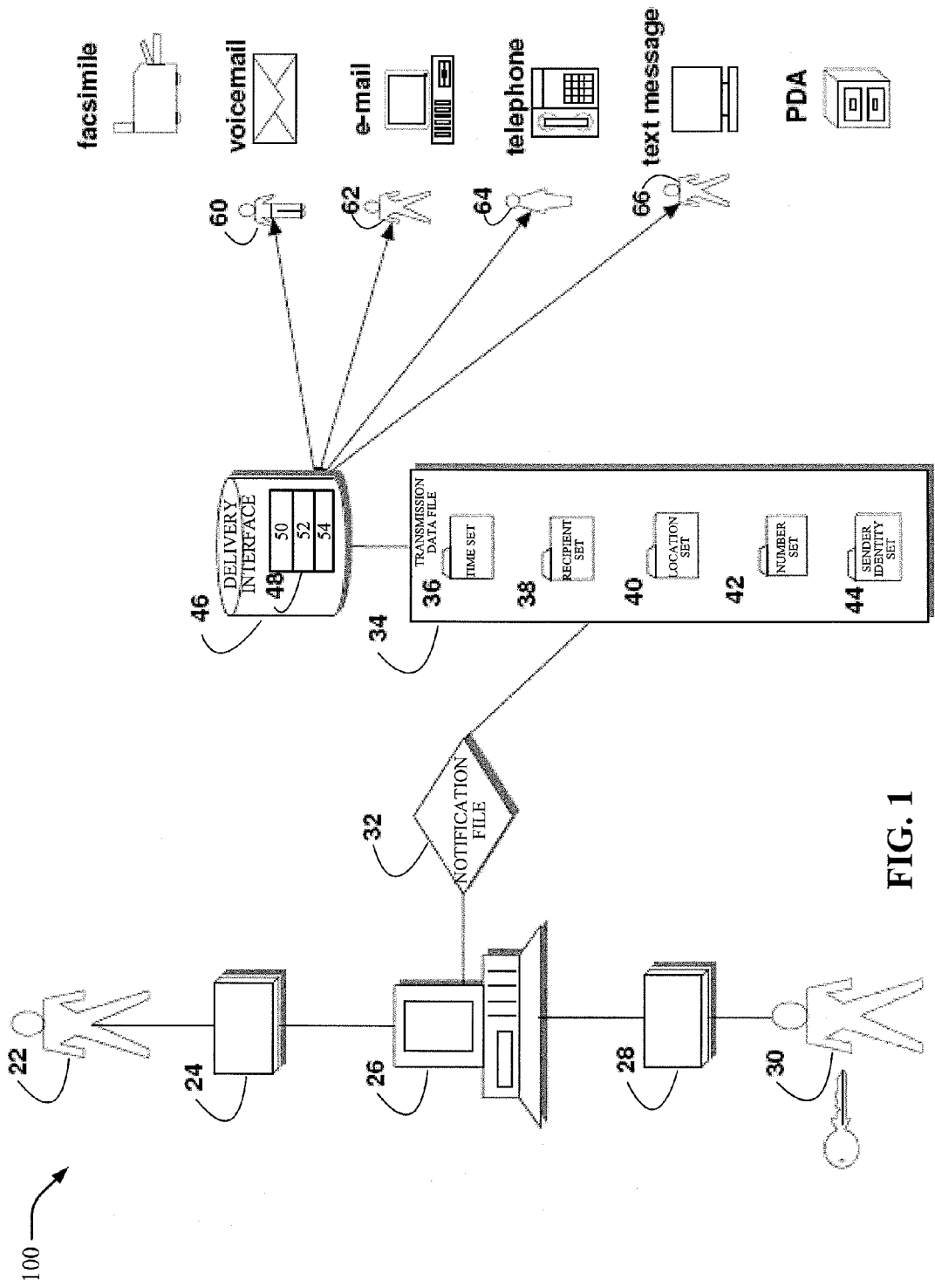
FIG. 1 is a diagram illustrating an example of a mass notification transmission system.

FIG. 1 is a diagram illustrating an example of a mass notification transmission system. For the following description, only one user from a single group of users is initially described in order to explain how notifications selected to be sent by the user are affected by the user's access privileges. However, the present disclosure will also describe the assignment of various access privileges to various users from different groups of users.

As can be seen in FIG. 1, a computer system 26 forms a core component of the system. The computer system 26 is preconfigured to receive a notification from a user 22 of the system who may wish to act as an initiator by sending that notification to a large number of recipients 60, 62, 64, and 66. The user 22 will have normally acquired the right to send a notification into the computer system 26 by the user's organization having earlier entered into a contract with the management of the system, entering the user's name on a list of legitimate users, paying the required fee if appropriate, and acquiring an entry code for authorization. With particular relevance to the present disclosure, access privileges of the user 22 to distribute the notification may be assessed by the computer system 26. The notification the user 22 sends to the computer system 26 may be sent in any one of a number of different formats via a transmission interface 24 (i.e., a transmissions module). It should be noted that an administrator 30 may also send a notification via a different transmission interface 28. The transmission interface 24 and/or 28 may be, for example, an ordinary land telephone, a radio transmitter, a cell phone, a computer for sending email, a computer with an internet connection, or it may be a facsimile machine for sending faxes, or the like. Also with particular relevance to the present disclosure, the administrator 30 may alter, assess, or otherwise affect the access privileges of the user 22 to distribute the notification.

Using the example discussed above, a message included in a notification might be: "Please clear your brush before fire season." The selected recipients might be a group of residents who live within a fire zone. The time and date to distribute might be "7:00 PM" and "tonight," and the methods of transmission to recipients selected by the user might include telephone and e-mail delivery. These choices are exemplary only.

Once the notification is received by the computer system 26 from the user 22, it is stored by the computer system 26 as a notification file 32 in a local or remote memory associated with the computer system 26. The notification file 32 that includes the message may be associated with a transmission data file 34 for later use, as set forth more fully below. If the notification received is an ordinary voice notification via an interface 24 which is a telephone, the analogue voice signal may be converted to a digital sound file such as a .wav file and stored by the computer system 26 as such. If the notification received via the interface 24 is an email, it may be stored by the computer system 26 as a .txt file, but it may also be converted to a sound file using text-to-speech (TTS) software. If the notification is received as a facsimile, it may be stored by the computer system 26 in a database or memory as a .pdf file. Such file formats are exemplary only. All of these notifications are stored pending distribution to the appropriate recipients in the appropriate form.

Once the notification file 32 is stored by the computer system 26, the notification file 26 is associated with the transmission data file 34 that is structured to include one or more of a number of data sets 36-44 that will later assist in controlling the transmission of the notification file 32. For example, the user 22 may insert information into the data sets 36-44 by entering keystrokes (telephone key, computer key, etc.) in response to queries from the computer system 26 as to what information should be entered in the data sets 36-44. The data sets 36-44 will then be associated with the notification file 32, as described.

The data sets 36-44 may comprise the following data sets. A time set 36 contains information relating to the time the notification is scheduled for distribution. A recipient set 38 contains information relating to recipients the notification is intended to reach, as will be discussed in further detail below. For example, the recipients may be all the parents of students at a school between 6th and 8th grades. A location set 40 contains information relating to the geographical locations the notification is intended to reach. For example, the intended recipients may be all the residents in a town living on one side of a river, or next to a combustible forest. Further data sets may be generated from information provided in preceding sets. For example, a number set 42 may be generated by the computer system 26 from the information entered into the recipient set 38, wherein the computer system 26 calculates the number of intended recipients of the notification, and enters that number into the number set 42 for later use.

A sender identity set 44 may contain the identity of the user 22 who created the notification, and, with particular relevance to the present disclosure, information relating to the status and rights of that user 22. The status and rights of the user 22 would be assessed based on the code entered by the user 22 to access the computer system 26 in order to initiate the notification, and/or the role(s) associated with the user 22. For example, the user identity set 44 may indicate that the role of the user 22 is principal of a school, and consequently the user 22 would be assumed to have a legitimate need to reach a large audience of parents of students at the school. Alternatively, the user identity set 44 may indicate that the role of another user is teacher of the 8th grade, who would typically want to reach only the parents of students in her 8th grade class, or perhaps all the 8th grade students in the school, but whose legitimate needs would not include communicating with the parents of all the students at a school. Notably, a user identity set 44 may indicate that the role of a further user is an administrator 30, e.g., higher in the hierarchy of the system, such as a school district representative, who may legitimately need to reach every parent of every student in the district. Furthermore, as an administrator 30, the school district representative may legitimately seek to monitor or otherwise control the access privileges of another user that is lower in the hierarchy of the system, such as the principal or the 8th grade teacher. In certain embodiments, information relating to the status and rights of a user 22 and/or an administrator 30 are included in the sender identity set 44 by either a user module or an administrator module, as discussed below with reference to FIG. 2.

As noted above, the notification 32 may be created in a plurality of formats (e.g., .wav, .txt, or .pdf). For example, the notification 32 may be created in at least one format, based on whether the notification is received via interface 24 as a voice notification, an email or a facsimile. Once the notification 32 is created in the appropriate plurality of formats (e.g., .wav, .txt, or .pdf) and is associated with the transmission data file 34 with its data sets, the computer system 26 stores the notification and associated data file in a delivery interface 46. The delivery interface 46 is configured to hold the notification in storage 48 until a triggering event occurs, such as the occurrence of a scheduled distribution time for the notification 32 or an approval by an administrator 30 to distribute the notification 32.

According to an embodiment of the disclosure, delivery interface 46 may include storage unit 48, which may store information including notification data 50, sender data 52 and recipient data 54. For example, in the context of education, storage unit 48 may be configured to include at least the following fields for each student: "Parent Name," "Student Name," "User 1," and "Message 1." To obtain information referred to by fields of transmission data file 34, delivery interface 46 may access the appropriate data from storage unit 48. For example, if recipient set 38 identifies the recipients as all parents of students at a school between 6th and 8th grades, the parent contact information for all 6th and 8th grade students can be accessed from storage unit 48. It should be noted that the storing of notification data 50, sender data 52 and recipient data 54 is not limited to storage unit 48, and that this data may be stored elsewhere in computer system 26 or in other external systems.

Within the delivery interface 46 in the computer system 26, each recipient of the notification 32 has already been associated with a form of transmission according to a prior request made by each potential recipient to the management of the system. Thus, for example, recipient 60 may have requested to be associated with a form of transmission by facsimile, recipient 62 may be associated with a form of transmission by voicemail, recipient 64 may be associated with a form of transmission by e-mail, recipient 66 may be associated with a means of transmission by text message, or pager, and so on. Thus, the computer system 26 is configured to transmit the notification 32 in appropriate format (e.g. .wav, .txt, .pdf) to each recipient, according to a known method. In certain embodiments, a means of transmission may be associated with the recipient based on a selection made by the user 22. For example, a user 22 may choose to associate a recipient with voicemail if the notification 32 is urgent. In certain embodiments, a means of transmission may be automatically associated with the recipient based on the content of the notification 32. For example, if the notification 32 includes an image, then means of transmission may be facsimile or email.

When a triggering event occurs, the delivery interface 46 causes one or many notifications 32 (having been delivered to the computer system 26 by an enabled user 22 possessing an appropriate access code) to be distributed, according to known methods, to a mass of recipients, e.g. recipients 60-66 of FIG. 1, identified by the user 22. Such notifications 32 may be combined with numerous similar notifications (e.g., in a notification batch) for mass transmission at approximately the same time. This capability of the system places power in the hands of an institution or group of people to keep classes of citizens informed of events that are directly relevant to them on a realtime or near realtime basis.

Considering further aspects of the disclosed systems and methods, an exemplary problem that may be encountered will now be described. Users whose legitimate interests may be to distribute a notification to smaller groups of recipients may attempt to distribute a notification to larger groups of recipients. The desire of different users to distribute notifications to larger groups may or may not be legitimate. For example, a citywide mass notification system may include as potential recipients all of the city's residents and employees. A city department head, such as a manager of the city's public works department, may use the system to legitimately send a notification to his employees, such as a notification to public works employees that a roadway is in need of emergency repair. This public works manager, however, typically would have access to distribute notifications to all potential recipients in the system, including all the city's residents and employees. This is an undesirable situation, as such a user is capable of sending mass notifications to a large number of recipients, regardless of whether that notification is appropriate for the recipients. In a mass notification transmission system such as the one illustrated in FIG. 1, it may be desirable to include a hierarchy of access privileges for users to be assigned based on their roles, which may entail the control of access privileges of users lower in the system hierarchy by other users (e.g., administrators) higher in the system hierarchy. Returning to the previous example, and according to the present disclosure, having a role as a city department head, the public works manager would only have access privileges to distribute notifications to his employees, while another user with administrator access privileges, such as the city mayor, may have access privileges to both (1) send mass notifications to all residents and employees of the city, e.g., in the event of an emergency, and (2) control the access privileges of city department heads, e.g., the public works manager. Thus, an efficient method and system for assigning access privileges based on roles in a hierarchically structured notification system is provided.

Figure 2:
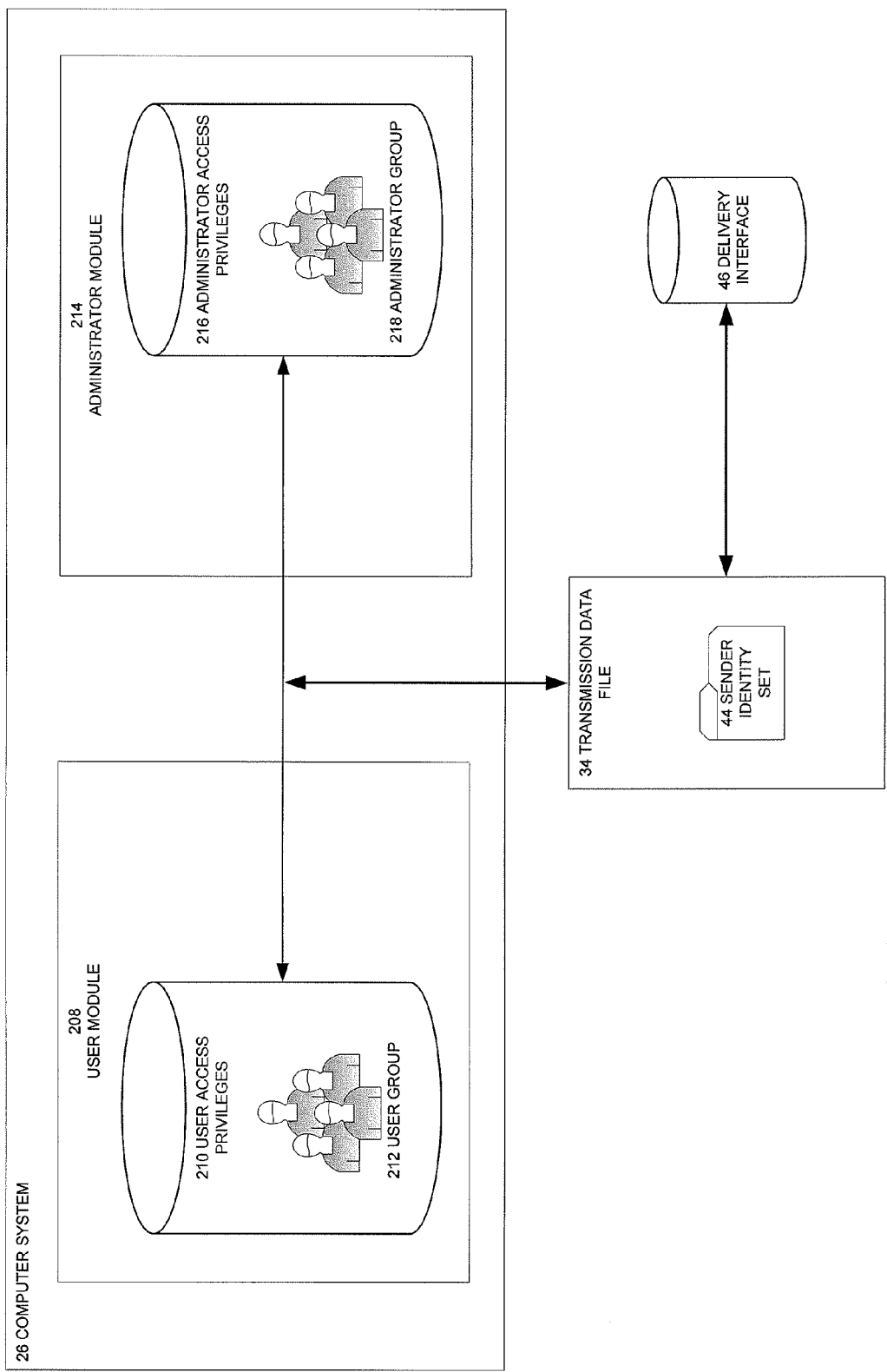
FIG. 2 is a diagram illustrating the computer system of FIG. 1.

FIG. 2 is a diagram illustrating a system for distributing notifications to intended recipients based on the access privileges associated with the role of the user selecting to distribute the notification, including the computer system 26 of FIG. 1. As can be seen in FIG. 2, computer system 26 includes a user module 208 and an administrator module 214. The user module 208 includes a user access privileges 210 data store, and the administrator module 214 includes an administrator access privileges 216 data store.

The user module 208 is configured to store, in the user access privileges 210 data store, information regarding user access privileges of the user group 212 to transmit notifications. Each user of the user group 212 shares at least one common role within the mass notification system. For example, each user of the user group 212 may be a lower ranking commissioned officer of the military, such as a captain. Because each user of the user group 212 shares at least one common role, each user of the user group 212 inherits certain common access privileges provided by the user access privileges 210 data store. The user access privileges 210 data store may include the access privilege that each user of the user group 212 can only send notifications to a subset of potential recipients within the system unless authorized by an administrator. For example, a captain may only send notifications to junior officers, unless the captain receives authorization within the system from an administrator, such as a colonel.

The administrator module 214 is configured to store, in the administrator access privileges 216 data store, information regarding administrator access privileges of the administrator group 218 to permit access to a user from the user group 212 to transmit notifications. Access permission to transmit notifications can be based on at least one of the user's access privileges, the notification to be transmitted, and the intended recipient(s) of the notification. Returning to the previous example, an administrator from the administrator group 218 with administrator access privileges 216, such as a colonel, can decide whether to authorize a user with user access privileges 210 from the user group 212, such as a captain, to transmit a notification based on the access privileges the captain is associated with, the notification the captain intends to transmit, and/or the intended recipient of the notification. By way of example, access privileges the captain is associated with may include whether the captain is restricted from transmitting notifications to any potential intended recipient. By way of another example, and with regards to a notification the captain intends to transmit, a notification with subject matter related to the captain's duties is more likely to be approved for transmission than a notification with subject matter unrelated to the captain's duties. By way of a further example, an administrator, when considering the intended recipient of the notification, is more likely to approve a notification intended to be received by officers junior to the captain for transmission than a notification intended to be transmitted to all officers in the military.

A new user added to a group defined in the notification system can automatically inherit at least some of the access privileges associated with that group. For example, a new user added to the user group 212 will inherit all of the user access privileges 210. Similarly, all of the access privileges associated with each user of a group of users can all be automatically changed when the access privileges associated with the group of users is changed. For example, if the administrator access privileges 216 are changed, such as to restrict the ability to add new administrators to the administrator group 218, then each administrator from the administrator group 218 will have his/her access privileges changed accordingly.

In certain embodiments, each of the user module 208 and the administrator module 214 is configured to include access privilege information from the user access privileges 210 data store and the administrator access privileges 216 data store, respectively, in the sender identity set 44 of the transmission data file 34. Returning to the previous example, if the captain (i.e., user 22 with user access privileges from the user group 212) requires and receives authorization from the colonel (e.g., administrator 30 with administrator access privileges from the administrator group 218), the user module 208 can include the captain's access privilege information in the sender identity set 44 to indicate the captain is the sender or initiator of the notification, and the administrator module 214 can further include the colonel's access privilege information in the sender identity set 44 to indicate the colonel approved the transmission of the notification. The transmission data file 34, which includes the sender identity set 44, may be stored in the delivery interface 46, as discussed above.

Although not illustrated herein, the computer system 26 can include other modules including access privilege data stores configured for other types of users. For example, a third or junior-level module may can include junior-level type access privileges that can be associated with a third type of user. The junior-level module can be configurable by an administrator, and may include, in a data store, information regarding the junior-level access privileges of a junior-level group to transmit a notification. Users in the junior-level group may inherit corresponding junior-level access privileges. One or both of the administration module 214 and the user module 208 may be configured to permit access to users with junior-level access privileges to transmit the notification based on the junior-level user's access privileges, the notification, and the intended recipient of the notification. By way of example only, if the junior-level user were a parent with junior-level access privileges, and a teacher had user access privileges 210, and a principal had administrator access privileges 216, then the administrator may not require authorization to distribute a notification, the teacher would require authorization from the principal to distribute a notification, and the parent would require authorization from the teacher and/or the principal to distribute a notification.

Furthermore, the user module 208 and the administrator module 214 are configured to work across groups (e.g., entities). Specifically, each of the user module 208, the administrator module 214, and the junior-level module are configured to store information for users, administrators, and/or junior-level users that are from various types of groups or organizations (e.g., users of a group share at least one common user trait or professional grouping, educational grouping, military grouping, company, municipality, geography, etc). In other words, and by way of example only, although each user of the user group 212 shares at least one common role, they may be members of different types of groups. Thus, a user from a first type of group may require authorization from an administrator from a second group, while a junior-level user from a third group may require authorization from the user and/or the administrator from the first and second groups, respectively.

For example, a junior level user can be a teacher and the junior level user group can be a group of school employees, a user can be an city educational committee member and the user group can be a group of the city's elected officials, and the administrator can be a state superintendent and the administrator group can be the state's department of education officials. Thus, the city educational committee member may require authorization from the state superintendent to send a notification, while the teacher may require authorization from either the city educational committee and/or the state superintendent to send a notification.

Figure 3:
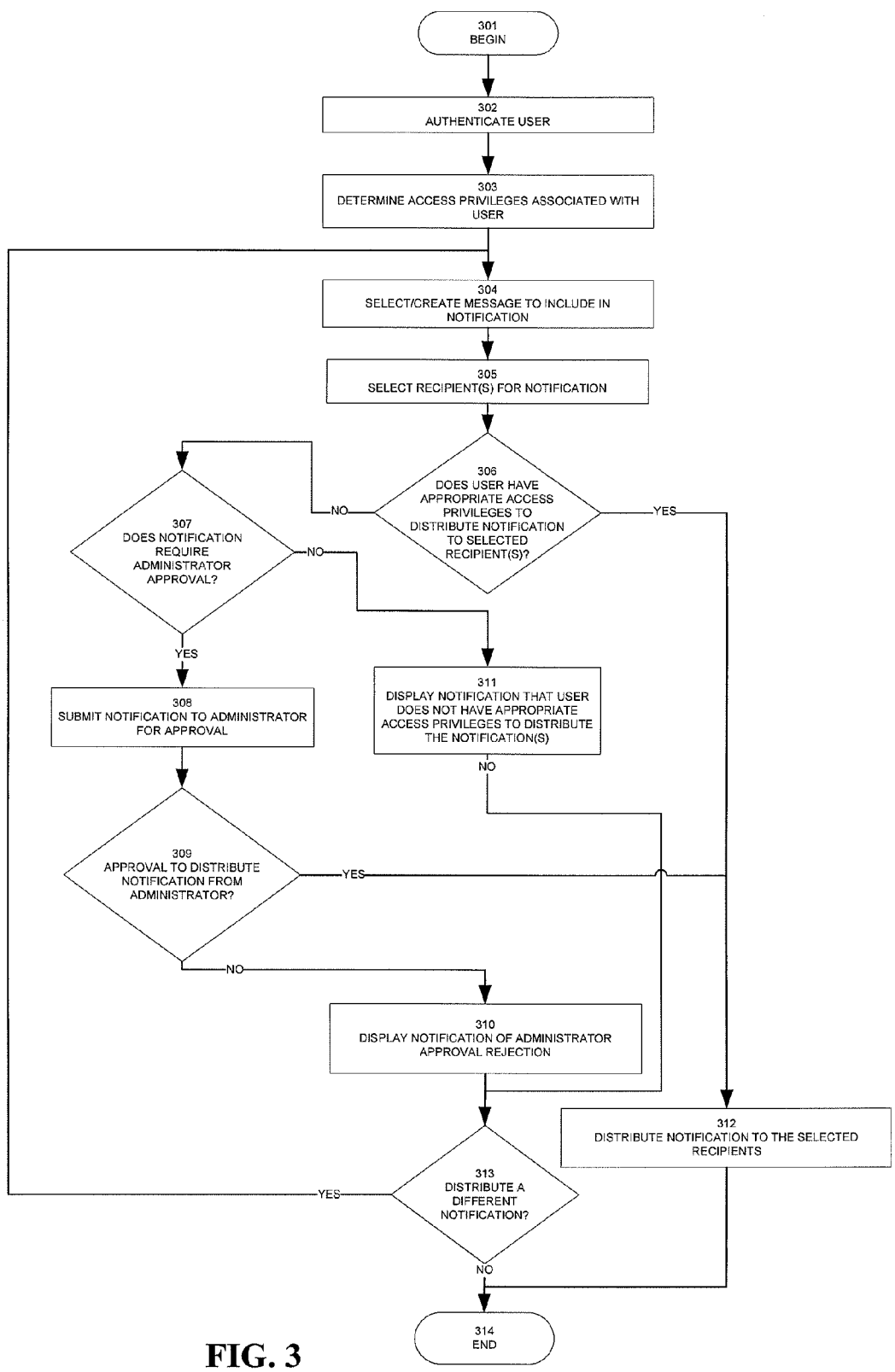
FIG. 3 is a flow chart illustrating an exemplary operation of determining notifications to distribute to intended recipients based on the access privileges associated with the role of the user intending to distribute the notification.

FIG. 3 is a flow chart illustrating an exemplary operation of determining notifications to distribute to intended recipients based on the access privileges associated with the role of the user intending to distribute the notification.

The process proceeds from beginning step 301 to step 302 in which a user is authenticated. Authentication may be achieved using methods known to those with skill in the art, such as requiring a username and password. This first step ensures that users of the notification system have appropriate authority to distribute notifications to a mass of recipients, or even a single recipient. Next, in step 303, access privileges associated with the user based on role are determined. In step 304, a message is created and/or selected to be included in a notification to be distributed to the selected recipients, who are selected in step 305. If, in decision step 306, the user is determined to have appropriate access privileges to distribute the notification to the selected recipients, the process moves to step 312, in which the notification is distributed to the selected recipients, and the process ends in step 314. Otherwise, the process moves from decision step 306 to step 307, in which it is determined whether the notification requires administrator approval (e.g., approval from a person with administrator access privileges).

If, in decision step 307 it is determined that the notification does not require administrator approval, the process moves to step 311. In step 311, a notification is displayed that the user does not have the appropriate access privileges to distribute the notification. The process then proceeds to decision step 313.

If, however, in decision step 307 the notification does require administrator approval, the notification is submitted to an administrator for approval in step 308, and the process then moves to decision step 309. In decision step 309, if the administrator approves the sending of the notification, the process moves to step 312, in which the notification is distributed to the selected recipients, and the process ends in step 314. If, however, in decision step 309, the administrator does not approve sending of the notification, the process first moves to step 310 in which a notification of the administrator's rejection of approval is displayed to the user, and then the process proceeds to decision step 313.

In decision step 313, the user can decide whether to distribute a different notification. If the user decides to distribute another notification, the process returns to step 304. Otherwise, the process ends in step 314.

Having set forth in FIG. 3 a process by which notifications to distribute to intended recipients are determined based on the access privileges associated with the role of the user selecting to distribute the notification, an example will now be presented using the sample screenshots of FIGS. 4A-4D and the process of FIG. 3, where the user is a school teacher, Mary Smith, having a role of "faculty." FIGS. 4A-4D are sample interfaces for selecting a notification to distribute to the teacher's intended recipients based on the access privileges associated with the faculty role of the teacher.

The process proceeds for the teacher from beginning step 301 to step 302 in which the teacher logs in to the system using a web interface in order to authenticate her identity. Next, in step 303, the teacher's access privileges are determined. The system may reference previous access privilege information that was entered for the teacher, such as by an administrator. FIG. 4A illustrates a sample interface 400 for an administrator for configuring the access privileges of the teacher through her faculty role. The sample interface includes an option 401 for activating authorization for different user roles 402 in the system, including users with student roles, administrative roles, faculty roles, staff roles, or other roles. Access privileges for one role may be required independently 403 from requiring access privileges for another role, and may further be configured according to at least one of (a) the format of notification 404 that is distributed, (b) the number or percentage of potential recipients receiving the notification 405, and (c) the time the notification is to be distributed 406. Access privileges may further be configured according both (b) the percentage of potential recipients receiving notification 407 and (c) the time the notification is to be distributed 406. The interface further displays administrators that are capable of providing such authorization 408 for the users. In the sample interface, the access privileges associated with the teacher 409 are configured to require authorization for all formats of notification that either reach 100% of the potential recipients in the system or are distributed between 7:00 PM and 7:00 AM.

In step 304, the teacher creates a message "Welcome Back" to be included in a notification to be distributed to 3186 recipients, who the teacher selects in step 305. The teacher may further select the format the notification is to be distributed in to each of the recipients. In decision step 306, the teacher is determined not to have appropriate access privileges to distribute the notification to the selected recipients, and the sample interface 410 illustrated in FIG. 4B is displayed. The sample interface confirms to the teacher the details of the notification that the teacher needs authorization to distribute because of the teacher's lack of appropriate access privileges. The sample interface includes the message 414 included in the notification ("Welcome Back"), the number of selected recipients 415 (3186), the notification formats 411 (phone, email, and short message service (SMS)), the selected time for distribution of the notification 412 ("10/29/2008 at 1:30 PM (PT)"), and a statement 413 to the teacher that she acknowledges she does not have the appropriate access privileges to distribute the notification and that authorization by an administrator may be required.

The process for the teacher proceeds to step 307, in which it is determined the notification requires administrator approval (e.g., from one of the administrators 408 illustrated in FIG. 4A). The sample interface 420 illustrated in FIG. 4C, in which the teacher is informed she must contact an administrator 408 to receive authorization for her notification, is then displayed to the teacher. Next, in decision step 309, the teacher's notification is submitted to one of the administrators 408 for approval, whom she may have contacted regarding the notification. While the notification is pending approval by an administrator 408, a sample interface 430 as illustrated in FIG. 4D may display the status of the notification 431 to the teacher, and optionally allow her to edit, delete, or view a summary 432 of the notification. When the administrator 408 approves the distribution of the teacher's notification, the process moves to step 312, in which the teacher's notification is distributed according to her selections, i.e., on Oct. 29, 2008 at 1:30 PM Pacific Time to the 3,186 selected recipients via telephone, e-mail, and SMS. The process for the teacher ends in step 314.

With the above-described system and method, proper access to distribute mass notifications to potential recipients is checked to ensure that notifications are delivered appropriately. By assigning access privileges to users based on those users' roles, authorization of the distribution of notifications is made more efficient and the distribution of legitimate notifications is more properly ensured.

Figure 5:
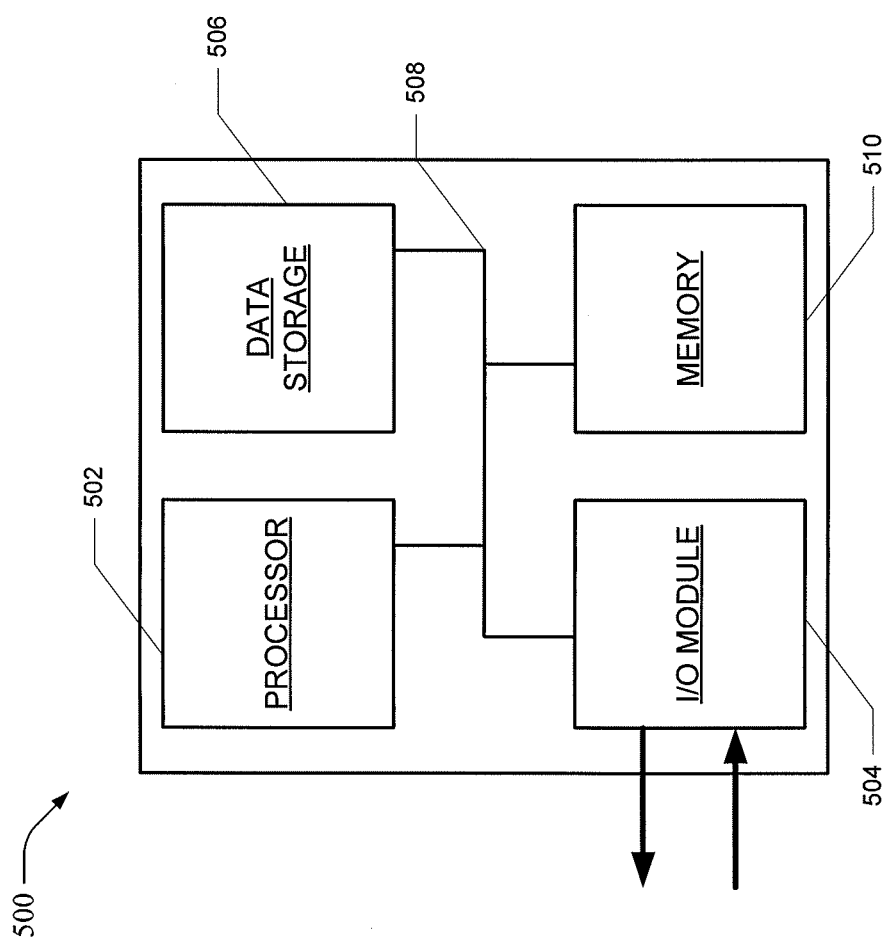
FIG. 5 is a block diagram illustrating an example of a computer system upon which notifications can be distributed to intended recipients based on the access privileges associated with the role of the user selecting to distribute the notification.

FIG. 5 is a block diagram that illustrates a computer system 500 upon which an embodiment of the present disclosure may be implemented in accordance with one aspect of the present disclosure. Computer system 500 includes a bus 508 or other communication mechanism for communicating information, and a processor 502 coupled with bus 508 for processing information. Computer system 500 also includes a memory 510, such as a random access memory ("RAM") or other dynamic storage device, coupled to bus 508 for storing information and instructions to be executed by processor 502. Memory 510 may also be used for storing temporary variable or other intermediate information during execution of instructions to be executed by processor 502. Computer system 500 further includes a data storage device 506, such as a magnetic disk or optical disk, coupled to bus 508 for storing information and instructions.

Computer system 500 may be coupled via I/O module 504 to a display device, such as a cathode ray tube ("CRT") or liquid crystal display ("LCD") for displaying information to a computer user. An input device, such as, for example, a keyboard or a mouse may also be coupled to computer system 500 via I/O module 504 for communicating information and command selections to processor 502.

According to one aspect of the present disclosure, the transmission of notifications may be implemented using a computer system 500 in response to processor 502 executing one or more sequences of one or more instructions contained in memory 510. Such instructions may be read into memory 510 from another machine-readable medium, such as data storage device 506. Execution of the sequences of instructions contained in main memory 510 causes processor 502 to perform the process steps described herein. One or more processors in a multi-processing arrangement may also be employed to execute the sequences of instructions contained in memory 510. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 506. Transmission media include coaxial cables, copper wire, and fiber optics, including the wires that comprise bus 508. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for determining access privileges for transmitting mass notifications, comprising:
 a hardware processor configured to:
  transmit at least one notification to at least one recipient from a group of recipients;
  store information in a user module regarding user access privileges of at least one user group to transmit the at least one notification, the at least one user group comprising at least one user that inherits the user access privileges of the at least one user group, wherein the user access privileges are assigned to the at least one user group based on at least one of an intended recipient of the at least one user group and content of a notification to be transmitted from the at least one user group; and store information in an administration module regarding administrator access privileges of at least one administrator group, and access permission to transmit the at least one notification by the at least one user based on the at least one user's user access privileges, the at least one notification, and the at least one recipient, wherein the at least one administrator group comprises at least one administrator that inherits the administrator access privileges, and wherein the administration module is configurable by the at least one administrator based on the administrator access privileges.

2. The system of claim 1, wherein the at least one user is required to receive authorization from the at least one administrator to transmit the at least one notification.

3. The system of claim 1, wherein user access privileges further include at least one of the ability to create and edit the at least one notification.

4. The system of claim 1, wherein user access privileges further include the ability to stop the transmission of the at least one notification.

5. The system of claim 1, wherein each member of the at least one user group has the same user access privileges.

6. The system of claim 1, wherein each member of the at least one administrator group has the same administrator access privileges.

7. The system of claim 1, wherein the administrator access privileges include at least one of the ability to add, remove, and change members of the at least one user group.

8. The system of claim 1, wherein a new user added to the at least one user group automatically inherits the user access privileges of the at least one user group, and wherein a new administrator added to the at least one administrator group automatically inherits the administrator access privileges of the at least administrator group.

9. The system of claim 1, wherein the administrator access privileges include at least one of the ability to add, remove, and change at least one of the user access privileges and the administrator access privileges.

10. The system of claim 1,
wherein the at least one administrator group comprises a plurality of administrators that inherit the administrator access privileges and that are members of a first organization, and
wherein the at least one user group comprises a plurality of users that inherit the user access privileges and that are members of a second organization.

11. The system of claim 1,
wherein the processor is further configured to store, in a junior level module, information regarding junior-level access privileges of at least one junior-level group to transmit the at least one notification, the at least one junior-level group comprising at least one junior-level user that inherits the junior-level access privileges of the at least one junior-level group,
wherein the processor is configured to permit access to transmit the at least one notification by the at least one junior-level user based on the at least one junior-level user's junior-level access privileges, the at least one notification, and the at least one recipient, and
wherein the junior-level module is configurable by the at least one administrator based on the administrator access privileges.

12. A method for determining access privileges for transmitting mass notifications, comprising:

storing, by a hardware processor, information regarding user access privileges of at least one user group to transmit at least one notification, the at least one user group comprising at least one user that inherits the user access privileges of the at least one user group, wherein the user access privileges are assigned to the at least one user group based on at least one of an intended recipient of the at least one user group and content of a notification to be transmitted from the at least one user group;

storing information regarding administrator access privileges of at least one administrator group; and permitting access to transmit the at least one notification by the at least one user based on the at least one user's user access privileges, the at least one notification, and the at least one recipient, wherein the at least one administrator group comprises at least one administrator that inherits the administrator access privileges, and wherein the administration module is configurable by the at least one administrator based on the administrator access privileges.

13. The method of claim 12, wherein the at least one user is required to receive authorization from the at least one administrator to transmit the at least one notification.

14. The method of claim 12, wherein user access privileges further include at least one of the ability to create and edit the at least one notification.

15. The method of claim 12, wherein user access privileges further include the ability to stop the transmission of the at least one notification.

16. The method of claim 12, wherein each member of the at least one user group has the same user access privileges.

17. The method of claim 12, wherein each member of the at least one administrator group has the same administrator access privileges.

18. The method of claim 12, wherein the administrator access privileges include at least one of the ability to add, remove, and change members of the at least one user group.

19. The method of claim 12, wherein a new user added to the at least one user group automatically inherits the user access privileges of the at least one user group, and wherein a new administrator added to the at least one administrator group automatically inherits the administrator access privileges of the at least administrator group.

20. The method of claim 12, wherein the administrator access privileges include at least one of the ability to add, remove, and change at least one of the user access privileges and the administrator access privileges.

21. A non-transitory machine-readable medium encoded with instructions for determining access privileges for transmitting mass notifications, the instructions comprising code for:

storing information regarding user access privileges of at least one user group to transmit at least one notification, the at least one user group comprising at least one user that inherits the user access privileges of the at least one user group, wherein the user access privileges are assigned to the at least one user group based on at least one of an intended recipient of the at least one user group and content of a notification to be transmitted from the at least one user group;

storing information regarding administrator access privileges of at least one administrator group; and permitting access to transmit the at least one notification by the at least one user based on the at least one user's user access privileges, the at least one notification, and the at least one recipient, wherein the at least one administrator group comprises at least one administrator that inherits the administrator access privileges, and wherein the administration module is configurable by the at least one administrator based on the administrator access privileges.

* * * * *